United States Patent [19]
Anthony et al.

[11] Patent Number: 4,720,148
[45] Date of Patent: Jan. 19, 1988

[54] BELT RETRACTOR WITH TONGUE/BUCKLE CONTROLLED LOCKING CAM

[75] Inventors: James R. Anthony; Allan R. Lortz, both of Carmel; David D. Merrick, Indianapolis; Michael A. Wiseman, Whiteland, all of Ind.

[73] Assignee: Indiana Mills & Mfg. Co., Inc., Carmel, Ind.

[21] Appl. No.: 937,039

[22] Filed: Dec. 1, 1986

Related U.S. Application Data

[63] Continuation-in-part of Ser. No. 769,061, Aug. 26, 1985.

[51] Int. Cl.$^4$ ................................................ B60R 21/10
[52] U.S. Cl. ..................................... 297/474; 297/476
[58] Field of Search ............... 297/474, 475, 479, 476, 297/477, 250; 242/107.4 R, 107.2

[56] References Cited

U.S. PATENT DOCUMENTS

| | | | |
|---|---|---|---|
| 3,248,148 | 4/1966 | Board et al. | 297/476 |
| 3,294,447 | 12/1966 | Riley | 297/476 |
| 3,301,593 | 1/1967 | Lamb | 297/476 |
| 3,915,402 | 10/1975 | Takada | 242/107.4 R |
| 4,025,111 | 6/1977 | Tanaka et al. | 297/476 |
| 4,295,684 | 10/1981 | Naitoh | 297/476 X |
| 4,305,618 | 12/1981 | Molnar | 297/479 X |
| 4,342,483 | 8/1982 | Takada | 297/250 X |
| 4,400,015 | 8/1983 | Ryo | 297/475 X |

FOREIGN PATENT DOCUMENTS

| | | | |
|---|---|---|---|
| 2426845 | 1/1976 | Fed. Rep. of Germany | 297/476 |
| 1311978 | 3/1973 | United Kingdom | 297/476 |
| 2175194 | 11/1986 | United Kingdom | 297/476 |

OTHER PUBLICATIONS

Quaker Oats/Fischer Price and B. Merten Agreement, Jun. 18, 1984.

*Primary Examiner*—Peter A. Aschenbrenner
*Attorney, Agent, or Firm*—Woodard, Emhardt, Naughton, Moriarty & McNett

[57] ABSTRACT

A retractor having means for controlling the withdrawal of belt therefrom being operated by insertion of a tongue into a buckle. A retractor frame has a spring biased rotatably mounted spool wrappingly receiving one end of a belt harness with the belt harness having an opposite end with buckle fixed thereto to receive a tongue mounted adjacent the retractor frame. A spring biased locking bar is engageable with ratchet shaped end plates of the spool. A cam plate pivotally mounted adjacent the spool is contactable against the locking bar. Insertion of the tongue into the buckle causes movement of the cam plate allowing the cam plate to rotate away from the locking bar. The locking bar is then pivotable into the ratchet shaped spool end plate preventing further withdrawal of the belt harness.

17 Claims, 11 Drawing Figures

BELT RETRACTOR WITH TONGUE/BUCKLE CONTROLLED LOCKING CAM

This application is a continuation-in-part of U.S. patent application Ser. No. 769,061 by James R. Anthony and Allan R. Lortz, filed Aug. 26, 1985 entitled BELT RETRACTOR WITH TONGUE/BUCKLE CONTROLLED LOCKING CAM.

BACKGROUND OF THE INVENTION

This invention is in the field of retractors typically used for seat belts.

DESCRIPTION OF THE PRIOR ART

Many patents have been granted disclosing a variety of automatic retracting devices which include a spring biased spool to normally withdraw the belt into the retractor, but yieldable to allow the belt to be withdrawn therefrom and attached at the opposite end to a buckle or tongue. Typically, the prior art spools include a ratchet configured end plate which is lockingly engaged by a spring biased bar pivotally mounted to the retractor frame. Many of the prior art retractors have means for holding the locking bar out of the locking position until a sufficient amount of belt webbing material has been withdrawn from the retractors. One such approach is to provide a belt follower engaged with the bar which will hold the bar out of position until a sufficient amount of belt web material has unwrapped from the spool. Another approach is to provide a gearing mechanism or cam plate for holding the bar away from the locking position until the spool has rotated to a predetermined angle. Once the locking bar is allowed to pivot into a locking position. the retractor is operable to prevent further withdrawal of the belt from the retractor. The various mechanisms including the clutch plate hold the locking bar out of the locking position until the retractor spool is slightly rewound. Thus, if the desired amount of belt material is not withdrawn from the retractor prior to attaching the opposite end of the belt to a tongue or a buckle, and if the spool is allowed to slightly rewind, then the retractor will lock preventing further withdrawal and attachment of the belt to the tongue or buckle. In such a case, the belt must be completely rewound on the spool providing considerable inconvenience to the user.

Disclosed herein is a mechanism for deactivating the clutch plate and locking bar until the tongue attached to the opposite end of the belt is inserted into a buckle whereupon the clutch plate is released allowing the locking bar to lockingly engage the retractor spool. It is known by The Quaker Oats Company through its Fisher-Price Division and there have been units commercially available which provide a mechanism to contact and hold the locking bar in the removed position until the tongue is inserted into the buckle. Such a known mechanism includes a spring biased lever pivotally mounted to the retractor frame independent of the clutch plate or ratchet spool and movable away from the locking bar which will then engage the ratchet wheel once the tongue and buckle are interengaged. Likewise, alternative design approaches have been suggested which include rotating the clutch plate or to provide a non-automatic manual lever for independent operation of the unit.

It is known to provide an child seat for mounting atop an automobile seat with the child seat having a harness for securing a child therein, such as shown in U.S. Pat. Nos. 4,025,111 and 4,342,483. It is also known to provide on a child seat a retractor with the aforementioned mechanism for directly contacting and holding the locking bar for the controlled withdrawal of the harness. The new and improved retractor disclosed herein is described in combination with such an child seat. Likewise, it is known to provide a locking bar which engage the ratchet spool only when the tongue and buckle are interengaged, such as shown in U.S. Pat. No. 3,915,402. Additional, prior art cited in the aforementioned parent patent application includes the U.S. Pat. Nos. 3,248,148, 3,301,593, 3,294,447, 4,400,015, 4,305,618, 4,295,684 and the German reference 2,426,845.

SUMMARY OF THE INVENTION

One embodiment of the present invention is a child seat harness for installation in an automobile including a child seat configured to receive a child and mountable upon an automobile seat, a harness mounted to the child seat and extendable over the child to secure the child within the child seat, an interlocking tongue and seat belt buckle mounted to the child seat and the harness, and, automatic retractor means mounted to the child seat and including a frame, a spool to wrappingly receive a portion of the harness and having an axle and end walls at least one of which is configured as a ratchet wheel with the spool rotatably mounted to the frame, a first spring mounted to the frame and normally urging the spool to rotate to a retracted position whereat the harness is wrapped thereon, a spring biased member mounted to the frame and movable between a removed position wherat the spring biased member is unlocked from the ratchet wheel and a locking position whereat the member lockingly engages the ratchet wheel limiting movement of the spool, and cam means including cam plate means mounted to the frame and movable from a first position extending outwardly of the ratchet wheel whereat the cam plate means contacts and blocks movement of the member to a second position inwardly of the ratchet wheel whereat the cam plate means moves allowing the member to move to the locking position, the cam means further including elongated operator means mounted to the frame with the operator means having spring means normally holding the cam plate means in the first position, the operator means having an outer end and being movable as the outer end of the operator means is contacted and moved by the interlocking tongue and seat belt buckle as the tongue is inserted into the seat belt buckle with the cam plate means moving to the second position.

It is an object of the present invention to provide a new and improved means for deactivating a belt retractor until a tongue attached to the belt is inserted into a buckle.

A further embodiment of the present invention is to provide a new and improved child seat with harness incorporating a locking retractor with means for deactivating the locking mechanism until the harness is secured.

In addition, it is an object of the present invention to provide a retractor for mounting to an child seat having a harness with tongue and buckle with the retractor having means for locking movement of the harness once the tongue is inserted into the buckle.

Related objects and advantages of the present invention will be apparent from the following description.

DESCRIPTION OF THE PREFERRED EMBODIMENT

Figure 1:
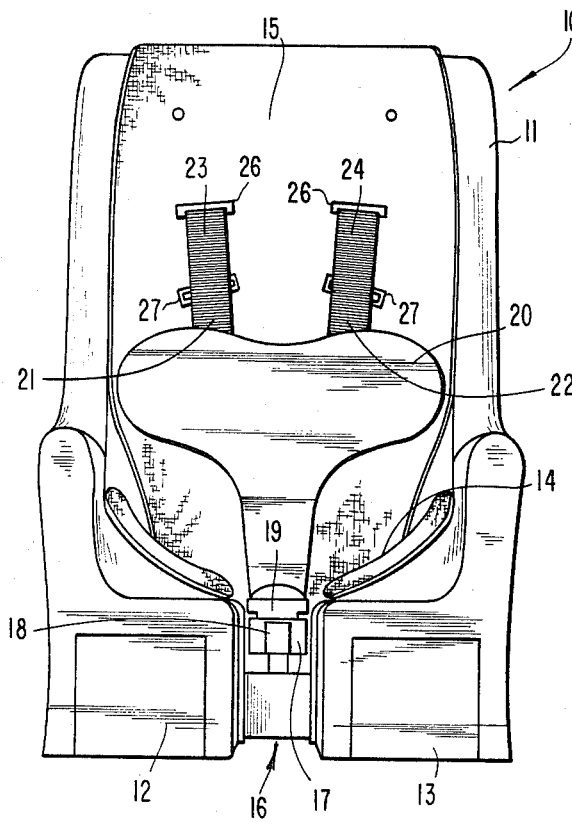
FIG. 1 is a front view of an child seat incorporating the new improved retractor disclosed herein.
Figure 2:
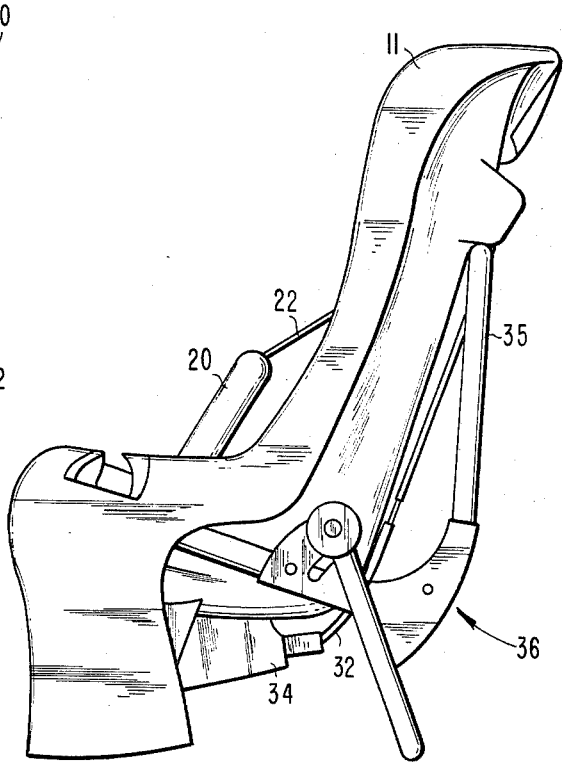
FIG. 2 is a side view of the seat of FIG. 1.
Figure 3:
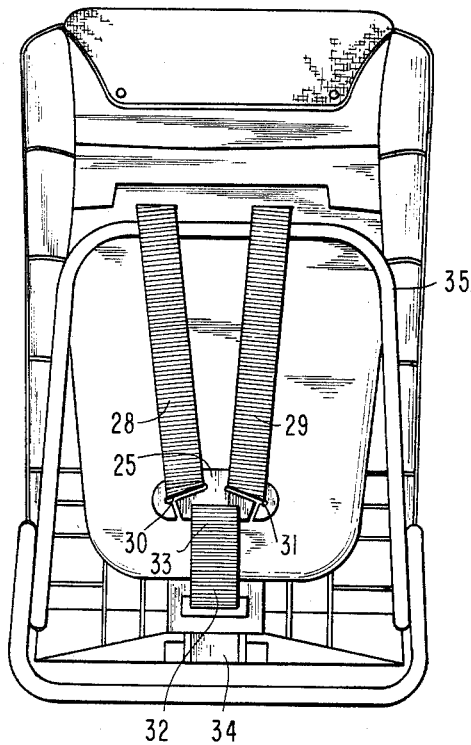
FIG. 3 is a rear view of the seat of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an child seat 10 including a plastic or fiberglass frame 11 with a pair of downwardly extending legs 12 and 13 positioned beneath a cushioned seat area 14 and a cushioned back supporting area 15. An indented area 16 is provided between legs 12 and 13 and has a seat belt buckle 17 mounted therein of conventional construction. The push button 18 of buckle 17 faces outwardly allowing the user to depress same and release a tongue 19 which is shown inserted into the buckle. The tongue is in turn attached to a relatively rigid cushioned shield 20 which is positioned over the entire front of the child supported by the seat. Shield 20 in turn is fixedly secured to ends 21 and 22, respectively, of belts 23 and 24 which extend through the seat and back down the rear side of the seat to a belt connector or bar 25. Two pairs of slots 26 and 27 are provided with the slots extending entirely through the back supporting portion 15 of the child seat. Belts 21 and 22 are inserted either through the pair of slots 26 or through the pair of slots 27 depending upon the size of child to be supported by the seat. The belts are extended through the upper pair of slots if a large child is to be supported whereas through the lower pair of slots 27 if a smaller child is to be supported. Thus, since ends 21 and 22 are fixedly secured to shield 20, the opposite ends 28 and 29 of belts 23 and 24 must be removably mounted to belt connector 25. Each end 28 and 29 is provided with a fabric loop construction which will slip, respectively, through slots 30 and 31 of the opposite ends of belt connector 25 with the outer distal ends of the belt connector 25 with the outer distal ends of the belt connector extending into slots 30 and 31 preventing accidental removal of the belts from belt connector 25.

Such a belt connector and plastic seat are conventional and are currently available in the market from a variety of sources. Applicant has added the improved retractor to be disclosed herein.

A third belt 32 has a distal end 33 fixedly secured to belt connector 25 with the proximal end of the belt being wrappingly mounted on a spool within retractor 34. A plurality of conventional tubing 35 forms a rear frame 36 which is adjustable to support the child seat at a proper angle upon an automobile seat. Tubing 35 may be utilized to secure the child seat to an automobile seat by any suitable means such as by extending the automobile seat belt securely around tubing 35.

Figure 6:
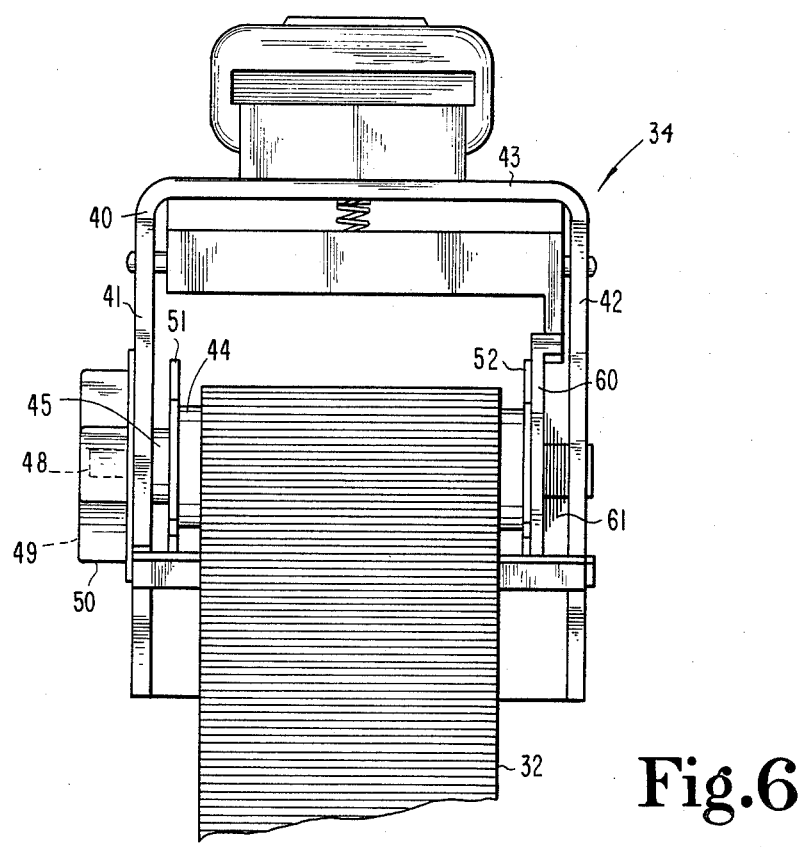
FIG. 6 is a bottom view of the retractor of FIG. 4.
Figure 7:
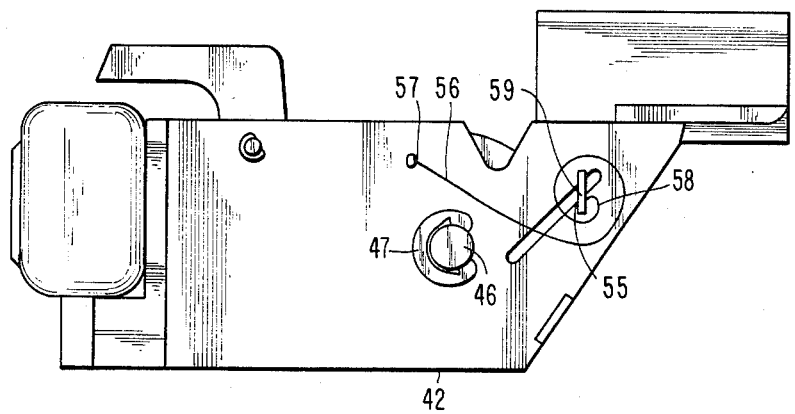
FIG. 7 is a side view of the retractor of FIG. 4.

Retractor 34 (FIG. 6) includes a U-shaped frame 40 having a pair of spaced apart side walls 41 and 42 integrally joined together by an end wall 43. A retractor spool 44 is rotatably mounted to an between side walls 41 and 42 and includes an axle 45 extending through the side walls with one outer end 46 (FIG. 7) secured to side wall 42 by means of a conventional spring biased C-clamp 47 extending into a circumferentially extending groove provided in end 46. The opposite end 48 of axle 45 extends through side wall 41 and is attached to a helical spring 49 provided within cover 50. The helical spring is operable to urge the axle to rotate and withdraw belt 32 into the retractor, but is yieldable to allow for the withdrawal of the belt therefrom in direction of arrow 85.

A pair of ratchet shaped end plates 51 and 52 are fixedly attached to axle 45 immediately inward of side walls 41 and 42 and rotate with the axle as belt 32 is pulled from or withdrawn into the retractor. The belt is wrappingly mounted to axle 45.

Side walls 41 and 42 are integrally joined to a cross member 53 (FIG. 4) secured to the frame 11 of the seat. Likewise, end wall 43 along with buckle 17 is secured to frame 11 with the retractor being located beneath or adjacent the inner side of the seat. An additional cross member 54 (FIG. 4) extends between and secures the side walls of the retractor frame together and provides a guide for the belt 32. A spring biased locking bar 55 has opposite ends which extend through side walls 41 and 42 and is pivotable from a removed position to a locking position whereat the locking bar engages the ratchet shaped end plates 51 and 52 of the spool. A wire spring 56 has one end 57 attached to side wall 42 and an opposite end 58 attached to the outer end 59 of bar 55 with the spring being operable to normally force bar 55 into engagement with the spool ratchet shaped end plates.

A cam plate 60 (FIG. 4) is pivotally mounted to axle 45 which extends therethrough and is forced against end plate 52 (FIG. 6) by spring 61. Spring 61 is operable to urge cam plate 60 against plate 52 in order that the end plate will frictionally engage the cam plate and rotate same as the spool is rotated with movement of belt 32.

Cam plate 60 has an upraised portion 62 operable to hold locking bar 55 away from the ratchet configured end plate 52. Upraised portion 62 is indented at location 63 providing a recess 64 to allow locking bar 55 to pivot in order that end 65 of the locking bar may enter into recess 64 and block further rotation of the spool. The retractor described with cam plate, locking bar and ratchet shaped spool is conventional in nature. The improvement includes the mounting of a pivotally movable operator 70 which is operable to hold the clutch plate in such a position thereby deactivating the locking bar and allowing free movement of the spool. As tongue 19 is inserted into buckle 17, operator 70 is forced to pivot thereby releasing the clutch plate 60 in turn allowing the locking bar to move eventually into a locking position preventing further withdrawal of the belt from the retractor.

Operator 70 includes ends 71 and 72 which extend in opposite directions. End 71 extends through a slot provided in the seat frame 11 to a position immediately adjacent the mouth 73 of buckle 17. End 72 extends towards the cam plate and captures projection 74 of the plate resting immediately adjacent stop surface 75 of projection 74. A helical spring 76 located between the retractor end wall 43 and operator 70 is operable to urge the operator to the position shown in FIG. 4 with end 72 engaged with projection 74 and end 71 located adjacent mouth 73. Spring 76 is located beneath the pivot point 77 of operator 71. Pivot point 77 includes a pin extending through operator 70 and through the retractor side walls 41 and 42 pivotally mounting the operator to the retractor side walls.

Figure 4:
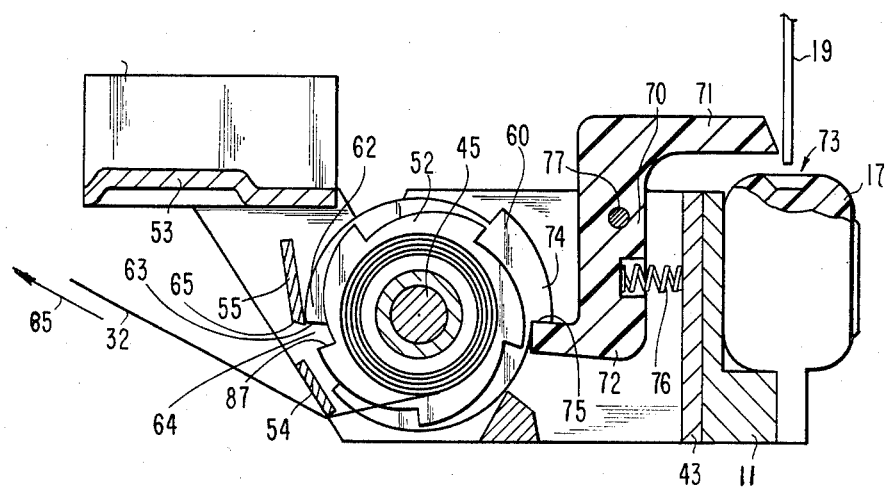
FIG. 4 is an enlarged longitudinal section of the retractor mounted to the bottom of the child seat of FIG. 1 and showing the tongue and buckle separated allowing for freedom of movement of the belt.
Figure 5:
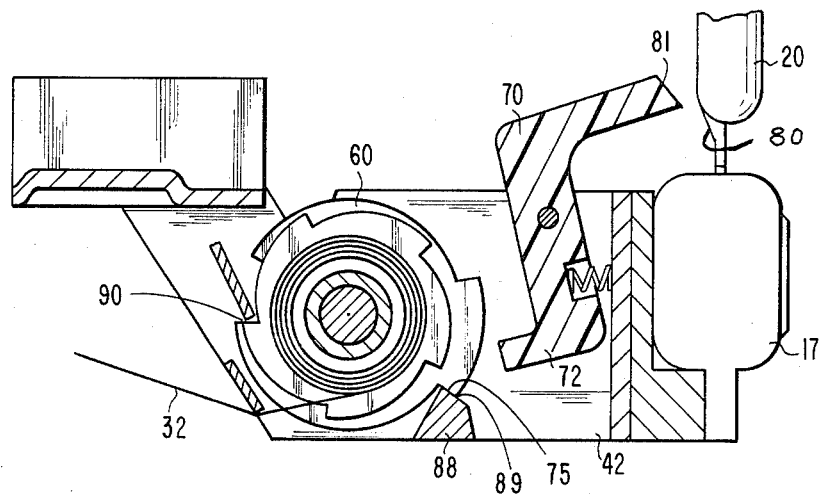
FIG. 5 is the same view of FIG. 4 only showing the tongue inserted into the buckle releasing the clutch plate and locking the retractor spool in a stationary position.

Tongue 19 fixedly attached to sheild 20 includes an inclined surface 80 (FIG. 5) contactable against surface 81 of operator 70 as tongue 19 is inserted into buckle 17. In the alternative embodiment, surface 80 and surface 81 are each inclined at a twenty-three degree angle with respect to the vertical longitudinal axis of tongue 19. The angle may vary from approximately fifteen degrees to thirty degrees from the tongue axis. Importantly, both surface 80 and 81 must be relatively smooth in order to achieve the proper pivoting action of operator 70. In the same embodiment, the pivot axis of operator 70 is offset approximately one inch from the tongue vertical longitudinal axis. As the tongue is inserted completely into the buckle, surface 81 will ride upwardly along surface 80 causing counter-clockwise rotation of rotator 70 as viewed in FIG. 5 thereby disengaging end 72 from surface 75 and releasing the clutch plate 60. Initially prior to withdrawing any portion of belt 32 from the retractor, projection 62 rests against locking bar 55 holding the locking bar in a removed or unlocked position relative to the spool. Simultaneously, end 72 of retractor 70 is engaged with projection 74 of the cam plate, holding the cam plate as shown in FIG. 4. As the belt is withdrawn from the retractor, operator 70 will maintain the initial or first position of the cam plate thereby holding the locking bar in a removed position. Eventually, tongue 19 will be inserted into buckle 17 thereby contacting surfaces 80 and 81 together causing counter-clockwise rotation of the operator (FIG. 5) and releasing the operator from the cam plate. Subsequent minor movement of the harness or seat will cause rotation of the spool carrying cam plate 60 along therewith thereby moving projection 62 away from locking bar 55 and allowing the bottom end 65 of the bar to enter recess 64. Further, clockwise rotation of the spool (FIG. 5) will result in ratchet stop surface 87 contacting end 65 preventing further clockwise rotation of the spool. A projection 88 mounted to the inwardly facing surface of side wall 42 (FIG. 5) includes an upper stop surface 89 engageable with stop surface 75 of the cam wheel limiting further clockwise rotation of the cam plate. Surfaces 75 and 89 are positioned so that the bottom end 65 of locking bar 55 simultaneously engages ratchet stop surface 87 and cam plate stop surface 90.

The automatic retractor means disclosed herein includes a spring biased spool which wrappingly receives belt 32 and normally urges the belt and harness to a retracted condition, but is yieldable to allow withdrawal of the belt and harness. The operator 70 is normally engaged with the clutch plate 60 with a locking bar 55 limiting rotation of the spool only when the tongue is inserted into the buckle contacting the operator 70 and releasing the operator from the clutch plate 60.

Figure 8:
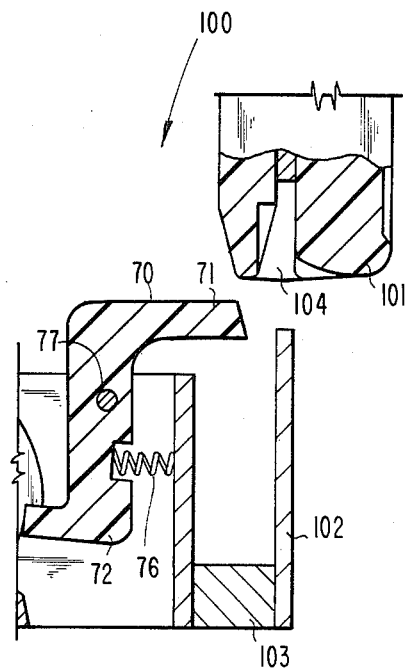
FIG. 8 is a fragmentary view of the right portion of the retractor shown in FIG. 4 and is identical therewith except that the buckle and tongue positions are reversed providing for an alternate embodiment.
Figure 9:
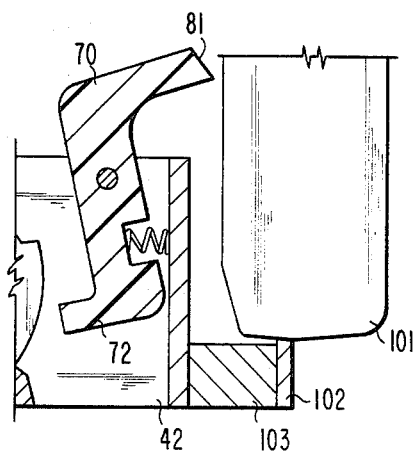
FIG. 9 is the same view of FIG. 8 only showing the buckle receiving the tongue and releasing the clutch plate.

An alternate embodiment is shown in FIG. 8 and 9 and is identical with the previous embodiment except that the positions of the buckle and tongue are reversed. Thus, only the right portions of FIGS. 4 and 5 have been repeated since the retractor and operation is identical. Buckle 100 includes a main body 101 having a mouth 104 to receive the tongue 102 mounted by spacer 103 onto the retractor wall 42. Tongue 102 does not have the slant surface 80 since the slant surface, which identical in angle to surface 80, is provided on the buckle surface facing the top end 71 of the operator 70. That is, the buckle slant surface facing top end 71 is inclined at a twenty-three degree angle with respect to the vertical longitudinal axis of tongue 102. The angle may vary from approximately fifteen degrees to thirty degrees from the tongue axis. As the buckle 100 is moved downwardly from the uninstalled position shown in FIG. 8 to the installed position of FIG. 9, the buckle contacts end 71 pivoting the operator counterclockwise as view in FIG. 8 thereby unlatching the clutch plate as previously described.

In the preferred embodiment, retractor 125 includes a retractor frame 126 fixedly mounted beneath the child seat as previously described and illustrated in FIG. 4. Frame 126 includes an upwardly extending tongue 127 which is extended into a conventional seat belt buckle 128 attached to the forward portion of the harness. The opposite end of the harness extends in an identical manner as previously described behind and beneath the seat with the harness including a belt 131 extending forwardly being wrappingly mounted to a spool 134 rotatably mounted by axle 130 to frame 126. Locking bar 133 is pivotably mounted between the opposite extending and spaced apart side walls of frame 126 and includes a conventional spring normally urging bar 133 to engage the two opposite ratchet shaped side walls of spool 134. Clutch plate 135 is rotatably mounted to axle 130 adjacent spool 134 and includes a cam ear 136 or projection which is movable against bar 133 to prevent the bar from engaging the ratchet shaped side walls of spool 134. An elongated leg 129 is integrally attached to clutch plate 135 and has a distal end contactable by buckle 128 as the buckle is moved downwardly to engage tongue 127. Tongue 127 is slotted to allow the distal end of leg 129 to extend therethrough preventing interference between the leg and tongue.

Figure 11:
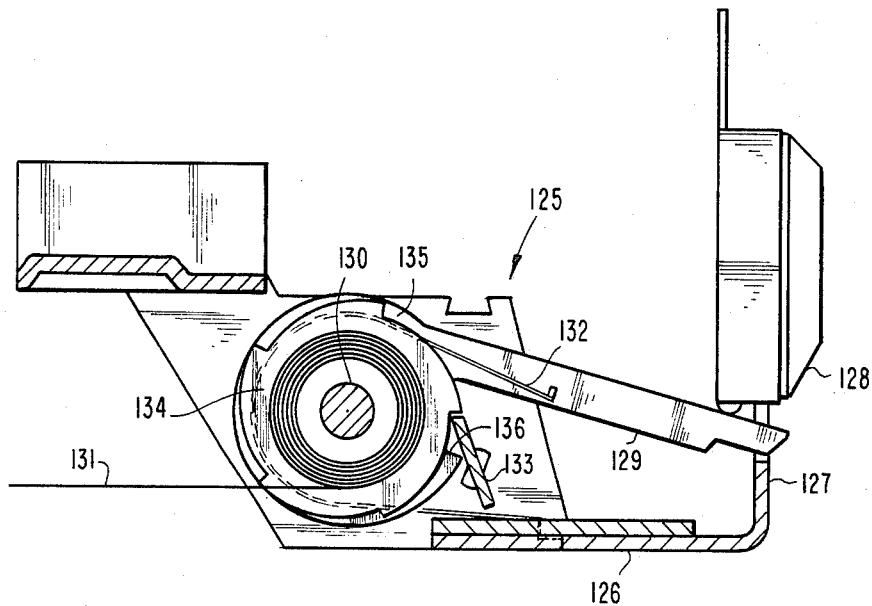
FIG. 11 is the same view as FIG. 10 only showing the retractor in the locked position.
Figure 10:
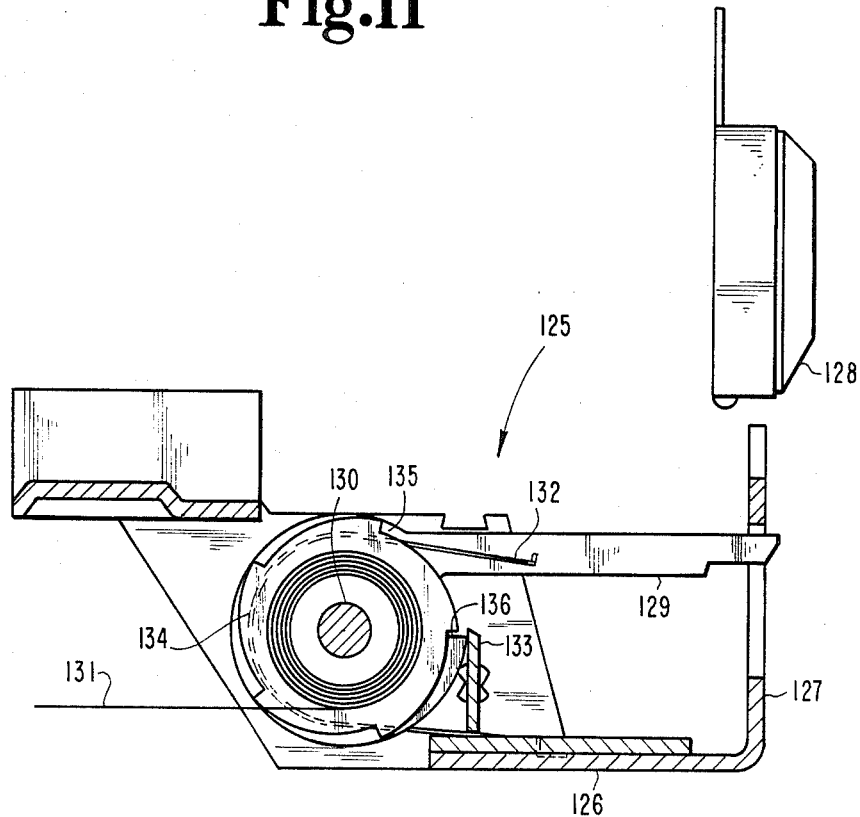
FIG. 10 is an enlarged longitudinal section of the preferred embodiment of the retractor mounted to the bottom of the child seat of FIG. 1 and showing the tongue and buckle separated allowing for freedom of movement of the belt.

The retractor is shown in the unlocked position in FIG. 10 with cam ear 136 resting against locking bar 133 and allowing free withdrawal of belt 131 from the retractor. As the buckle is installed onto the tongue in FIG. 11, the buckle contacts leg 129 causing rotation of the cam plate and movement of the cam plate away from the locking bar thereby allowing the bar to engage the ratchet side walls of the spool. The ratchet side walls are designed to allow retraction of the belt at all times but when engaged with the locking bar prevent withdrawal of the belt from the retractor. A wire spring 132 extends around axle 130 with one end engaged beneath and against leg 129 and the opposite spring end engaged with frame 126 urging leg 129 upwardly but being yieldable to allow movement of the leg downwardly when moved by the buckle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A child seat with harness for installation in an automobile comprising:
   a child seat configured to receive a child and mountable upon an automobile seat;
   harness means including a belt and being mounted to said child seat and extendable over the child to secure the child within said child seat;
   an interlocking seat belt buckle and tongue mounted to said child seat and said harness means; and,
   automatic retractor means mounted to said child seat and including a spring biased spool rotatably mounted thereto wrappingly receiving said belt and normally urging said belt to a retracted condition whereat said belt is wrapped on said spool but yieldably to allow withdrawal of said belt; and wherein:
   said retractor means includes a pair of spaced apart walls mounted to said child seat with said spool rotatably mounted thereto, a ratchet shaped end plate fixedly secured to said spool and rotatable therewith, a spring engaged with said spool urging said spool with said belt to said retracted condition, a cam plate movably mounted adjacent one of said walls, a spring biased bar movably mounted to said walls and having a locking position engageable with said ratchet shaped end plate and a removed position allowing said spool to rotate with said cam plate and normally positioned to contact said bar and hold said bar in said removed position but releasable to move with said spool as said belt is withdrawn and allow said bar to move to said locking position, and an elongated pivot member movably mounted to said seat with one end positioned adjacent said buckle and an opposite end positioned adjacent said cam plate normally holding said cam plate in position to hold said bar in said removed position but movable to release said cam plate to move allowing said bar to move to said locking position when said tongue is contacted against said one end and inserted into said buckle.

2. The child seat of claim 1 wherein:
said opposite end is spring biased against said cam plate.

3. The child seat of claim 2 wherein:
said cam plate includes a projection normally captured by said opposite end when said bar is in said removed position and said tongue is apart from said buckle.

4. The child seat of claim 3 wherein:
said end plate includes a stop surface contacted by said bar limiting movement of said spool when said bar is in said locking position and said tongue is inserted in said buckle contacting said pivot member.

5. A seat belt buckle/retractor combination comprising:
   a frame;
   a pair of interlocking members including a seat belt buckle and a mating tongue, said buckle mounted to said frame with said buckle having a mouth;
   a harness having an end with a belt thereat and an opposite end with said tongue thereat insertable into said mouth;
   a spool to wrappingly receive said belt and having an axle and end walls at least one of which is configured as a ratchet wheel with said spool rotatably mounted to said frame;
   a spring mounted to said frame and normally urging said spool to rotate to a retracted position whereat said belt is wrapped thereon;
   a spring biased member mounted to said frame and movable between a removed position whereat said spring biased member is located apart from said ratchet wheel and a locking position whereat said member lockingly engages said ratchet wheel limiting movement of said spool;
   a cam plate mounted to said frame adjacent one of said walls and movable from a first position whereat said cam plate contacts and blocks movement of said spring biased member to said locking position to a second position whereat said cam plate moves allowing said spring biased member to move to said locking position; and,
   an operator mounted to said frame and including a first end located near said mouth and a second end normally contactable against said cam plate to hold same in said first position, said operator movable away from said cam plate as said operator is contacted by said tongue when said tongue is inserted in said buckle allowing said cam plate to move to said second position.

6. The combination of claim 5 wherein:
said operator is pivotally mounted to said frame and has a tongue contact surface at said first end aligned with said mouth but diverging therefrom;
said tongue includes a flat main body with an inclined surface contactable with said contact surfaces as said tongue is inserted into said mouth forcing said operator away from said mouth and releasing said cam plate.

7. The combination of claim 6 and further comprising:
   an operator spring engaged between said frame and said operator being operable to normally urge said first end toward said mouth while said second end is in contact with and holding said cam plate but being yieldable to allow said operator to pivot when contacted by said tongue to release said cam plate.

8. The combination of claim 7 wherein:
said first end and said second end of said operator extend in opposite directions.

9. The combination of claim 8 and further comprising:

a child seat with said frame, said buckle and said harness mounted thereto, said child seat includes an outer side and an inner side with said frame mounted on said inner side and said buckle mounted on said outer side, said operator projects through said child seat to adjacent said frame and said buckle.

10. A retractor for mounting to an child seat having a harness, an interengaged combination of a tongue and seat belt buckle comprising:

a frame;

a spool to wrappingly receive a portion of said harness and having an axle and end walls at least one of which is configured as a ratchet wheel with said spool rotatably mounted to said frame;

a spring mounted to said frame and normally urging said spool to rotate to a retracted position whereat a portion of said harness is wrapped thereon;

a spring biased member mounted to said frame and movable between a removed position whereat said member is located apart from said ratchet wheel and a locking position whereat said member lockingly engages said ratchet wheel limiting movement of said spool;

a cam plate mounted to said frame adjacent one of said walls and movable from a first position whereat said cam plate contacts and blocks movement of said member to a second position whereat said cam plate moves allowing said member to move to said locking position; and, an operator mounted to said frame and including a first end and a second end with said second end normally contactable against said cam plate to hold same in said first position, said operator movable away from said cam plate as said first end of said operator is contacted by said interengaged combination when said tongue is inserted into said buckle allowing said cam plate to move to said second position.

11. The combination of claim 10 wherein:

said operator is pivotally mounted to said walls and has a tongue contact surface at said first end; and, said tongue includes a flat main body with an inclined surface contactable with said contact surface as said tongue is inserted into said buckle forcing said operator away from said buckle and releasing said cam plate.

12. The combination of claim 11 and further comprising:

an operator spring engaged between said frame and said operator being operable to normally urge said first end toward said buckle while said second end is in contact with and holding said cam plate but being yieldable to allow said operator to pivot when contacted by said tongue to release said cam plate.

13. The combination of claim 12 wherein:

said first end and said second end of said operator extend in opposite directions.

14. A retractor for mounting to a child seat having a harness, an interengaged combination tongue and seat belt buckle comprising:

a frame;

a spool to wrappingly receive a portion of said harness and having an axle and end walls at least one of which is configured as a ratchet wheel with said spool rotatably mounted to said frame;

a first spring mounted to said frame and normally urging said spool to rotate to a retracted position whereat a portion of said harness is wrapped thereon;

a spring biased member mounted to said frame and movable between a removed position whereat said member is unlocked from said ratchet wheel and a locking position whereat said member lockingly engages said ratchet wheel limiting movement of said spool; and, cam means including cam plate means mounted to said frame movable from a first position whereat said cam plate means extends outwardly of said ratchet wheel and contacts and blocks movement of said member to a second position whereat said cam plate means moves inwardly of said ratchet wheel allowing said member to move to said locking position, said cam means further including elongated operator means mounted to said frame with said operator means normally holding said cam plate means in said first position, said operator means having an outer end and being movable as said outer end of said operator means is contacted by said interengaged combination when said tongue is inserted into said buckle with said cam plate means moving to said second position.

15. The combination of claim 14 wherein:

said operator means is pivotally mounted to said walls and has a first contact surface at said outer end;

said combination tongue and seat belt buckle when mating have a second contact surface contactable with said first contact surface moving said operator means and releasing said cam plate means.

16. The combination of claim 15 and further comprising:

an operator spring engaged between said frame and said cam means being operable to normally urge said outer end in a first direction while said cam plate means is in contact with and holding said spring biased member but being yieldable to allow said operator means to pivot when contacted to release said cam plate means from said spring biased member.

17. A child seat harness for installation in an automobile comprising:

a child seat configured to receive a child and mountable upon an automobile seat;

a harness mounted to said child seat and extendable over the child to secure the child within said child seat;

an interlocking tongue and seat belt buckle mounted to said child seat and said harness; and, automatic retractor means mounted to said child seat and including a frame, a spool to wrappingly receive a portion of said harness and having an axle and end walls at least one of which is configured as a ratchet wheel with said spool rotatably mounted to said frame, a first spring mounted to said frame and normally urging said spool to rotate to a retracted position whereat said harness is wrapped thereon, a spring biased member mounted to said frame and movable between a removed position whereat said spring biased member is unlocked from said ratchet wheel and a locking position whereat said member lockingly engages said ratchet wheel limiting movement of said spool, and cam means including cam plate means mounted to said frame and movable from a first position extending outwardly of said ratchet wheel whereat said cam plate means contacts and blocks movement of said member to a second position inwardly of said ratchet wheel whereat said cam plate means moves allowing said member to move to said locking position, said cam means further including elongated operator means mounted to said frame with said operator means having spring means normally holding said cam plate means in said first position, said operator means having an outer end and being movable as said outer end of said operator means is contacted and moved by said interlocking tongue and seat belt buckle as said tongue is inserted into said seat belt buckle with said cam plate means moving to said second position.

* * * * *